(12) United States Patent  
Hunter et al.

(10) Patent No.: US 7,971,365 B2  
(45) Date of Patent: Jul. 5, 2011

(54) APPARATUS AND METHOD OF MEASURING WORKPIECES

(75) Inventors: Stephen Paul Hunter, Bristol (GB); Geoffrey McFarland, Wotton-under-Edge (GB); Kevyn Barry Jonas, Bristol (GB); Khaled Mamour, Bristol (GB)

(73) Assignee: Renishaw PLC, Wotton-under-Edge (GB)

( * ) Notice: Subject to any disclaimer, the term of this patent is extended or adjusted under 35 U.S.C. 154(b) by 168 days.

(21) Appl. No.: 12/224,657

(22) PCT Filed: Mar. 23, 2007

(86) PCT No.: PCT/GB2007/001068  
§ 371 (c)(1),  
(2), (4) Date: Sep. 3, 2008

(87) PCT Pub. No.: WO2007/107777  
PCT Pub. Date: Sep. 27, 2007

(65) Prior Publication Data  
US 2010/0011600 A1    Jan. 21, 2010

(30) Foreign Application Priority Data  
Mar. 23, 2006    (GB) .................................. 0605796.2

(51) Int. Cl.  
*G01B 21/04* (2006.01)  
*G01B 5/008* (2006.01)

(52) U.S. Cl. ........................................................ 33/503

(58) Field of Classification Search .................... 33/503, 33/551, 553, 554, 555  
See application file for complete search history.

(56) References Cited

U.S. PATENT DOCUMENTS

| | | | | |
|---|---|---|---|---|
| 4,631,834 A * | 12/1986 | Hayashi et al. | ................. | 33/503 |
| 4,888,877 A * | 12/1989 | Enderle et al. | ................. | 33/559 |
| 5,189,806 A * | 3/1993 | McMurtry et al. | ............. | 33/503 |
| 5,251,156 A * | 10/1993 | Heier et al. | ................. | 702/167 |
| 6,154,713 A | 11/2000 | Peter et al. | | |

(Continued)

FOREIGN PATENT DOCUMENTS

EP            0 473 010 A2       3/1992

(Continued)

OTHER PUBLICATIONS

Opposition of Carl Zeiss Industrielle Messtechnik GmbH, against European Patent No. 2 002 207, dated Dec. 8, 2010 (with translation).

(Continued)

*Primary Examiner* — Christopher W Fulton  
(74) *Attorney, Agent, or Firm* — Oliff & Berridge, PLC (57) ABSTRACT

A method and apparatus for measuring a surface using a surface sensing device mounted on a scanning head on a member of a coordinate positioning apparatus. The coordinate positioning apparatus may be operated to produce relative movement between the scanning head and the surface profile and the scanning head includes a drive for producing rotational movement of the surface sensing probe about one or more axis. The coordinate positioning apparatus is driven to provide relative movement between the member and the surface profile in a circular path and the probe head is driven to move the surface sensing device about said one or more axes, such that the surface sensing device maintains a nominally constant lead angle. The motion of the coordinate positioning apparatus and probe head is synchronous.

16 Claims, 12 Drawing Sheets

U.S. PATENT DOCUMENTS

| | | | |
|---|---|---|---|
| 6,546,643 B2 * | 4/2003 | Lotze et al. | 33/559 |
| 7,165,335 B2 * | 1/2007 | McMurtry | 33/503 |
| 7,293,365 B2 * | 11/2007 | McMurtry et al. | 33/556 |
| 7,503,125 B2 * | 3/2009 | Jordil et al. | 33/503 |
| 7,647,706 B2 * | 1/2010 | Jordil et al. | 33/503 |
| 2006/0053646 A1 * | 3/2006 | McFarland | 33/503 |
| 2009/0030648 A1 * | 1/2009 | Hunter et al. | 702/152 |

FOREIGN PATENT DOCUMENTS

| | | |
|---|---|---|
| EP | 0 866 390 A1 | 9/1998 |
| WO | WO 90/07097 A1 | 6/1990 |
| WO | WO 03/008900 A1 | 1/2003 |
| WO | WO 2005/090900 A1 | 9/2005 |
| WO | WO 2005/108917 A2 | 11/2005 |
| WO | WO 2006/115923 A2 | 11/2006 |

OTHER PUBLICATIONS

Opposition of TESA SA, against European Patent No. 2 002 207, dated Dec. 10, 2010 (with translation).

* cited by examiner

Fig. 14

APPARATUS AND METHOD OF MEASURING WORKPIECES

The present invention relates to a method of measuring the surface of a workpiece using a motorized scanning head mounted on a coordinate positioning apparatus such as a coordinate measuring machine (CMM), machine tool, manual coordinate measuring arm and inspection robot.

It is known from International Patent Application No. WO90/07097 to mount a motorized scanning head on a coordinate positioning machine. The motorized scanning head enables a stylus mounted on the motorized scanning head to be rotated about two nominally orthogonal axes.

The stylus may be positioned angularly about these two axes whilst the motorized scanning head can be positioned by the coordinate positioning machine in any position within the working volume of the machine.

Such a motorized scanning head provides a coordinate positioning machine with greater scanning flexibility because the motorized scanning head can position the stylus in many different orientations.

This application discloses measurement sequences in which simple movement of the coordinate positioning apparatus is combined with movement of the motorized scanning head to measure regularly shaped parts. For example a bore is measured by moving the quill of the CMM along a centre line while the motorized scanning head moves the stylus tip in a circular profile thus resulting in a helical motion.

This also discloses the measurement of a cone by driving the X and Y motors of the CMM to move the quill in a circular path while operating the M1 motor in bias mode and the M2 motor in the positioning mode. The biasing mode enables the tip to maintain contact with the surface while the scanning head is driven around the workpiece. This is done by applying to their rotors a substantially constant torque for a given input current.

This method of scanning features such as bores has the disadvantage that it is not suitable for large bores (i.e. if the radius of the bore is greater than the stylus length) or very small bores. Furthermore, this scanning method is not always possible due to access restrictions.

The present invention provides a method for measuring a surface profile using a surface sensing device mounted on a scanning head on a member of a coordinate positioning apparatus, wherein the coordinate positioning apparatus may be operated to produce relative movement between the scanning head and the surface profile and wherein the scanning head includes a drive for producing rotational movement of the surface sensing probe about two axes, the method comprising the following steps:
  driving the coordinate positioning apparatus to provide relative movement between the member and the surface profile in an arcuate, circular or spiral path;
  driving the scanning head to move the surface sensing device about said one or more axes, such that the lead angle is nominally constant;
  wherein the motion of the coordinate positioning apparatus and scanning head is synchronous.

The arcuate, circular or spiral motion of the member may be about an axis of the surface profile. The arcuate, circular or spiral motion of the member may be about an axis which is at an angle to a central axis of the surface profile. The arcuate, circular or spiral motion of the member may be about an axis which is parallel but offset to a central axis of the surface profile.

Preferably the motion of the coordinate positioning apparatus and the scanning head is synchronized through time increments.

The surface sensing device performs an oscillating motion (i.e. a sweep scan). Alternatively, it may perform a line scan.

Preferably, rotational movement about at least one axis of the scanning head is used to keep the surface sensing device within its measurement range.

A second aspect of the invention comprises a computer program comprising code adapted to perform the method when executed on a computer.

Preferably the computer program is provided on a carrier, such as a CD, USB stick or other medium, which when loaded onto a computer carries out the invention. The computer program may also be downloaded directly from the internet.

A third aspect of the present invention provides apparatus for measuring a surface profile comprising a surface sensing device mounted on a scanning head on a member of a coordinate positioning apparatus, wherein the coordinate positioning apparatus may be operated to produce relative movement between the scanning head and the surface profile and wherein the scanning head includes a drive for producing rotational movement of the surface sensing probe about two axes, and a computer, the computer carrying out the following steps:
  driving the coordinate positioning apparatus to provide relative movement between the member and the surface profile in an arcuate, circular or spiral path;
  driving the scanning head to move the surface sensing device about said one or more axes, such that the lead angle is nominally constant;
  wherein the motion of the coordinate positioning apparatus and scanning head is synchronous.

Examples of preferred embodiments of the invention will now be described with reference to the accompanying drawings wherein.

Figure 1:
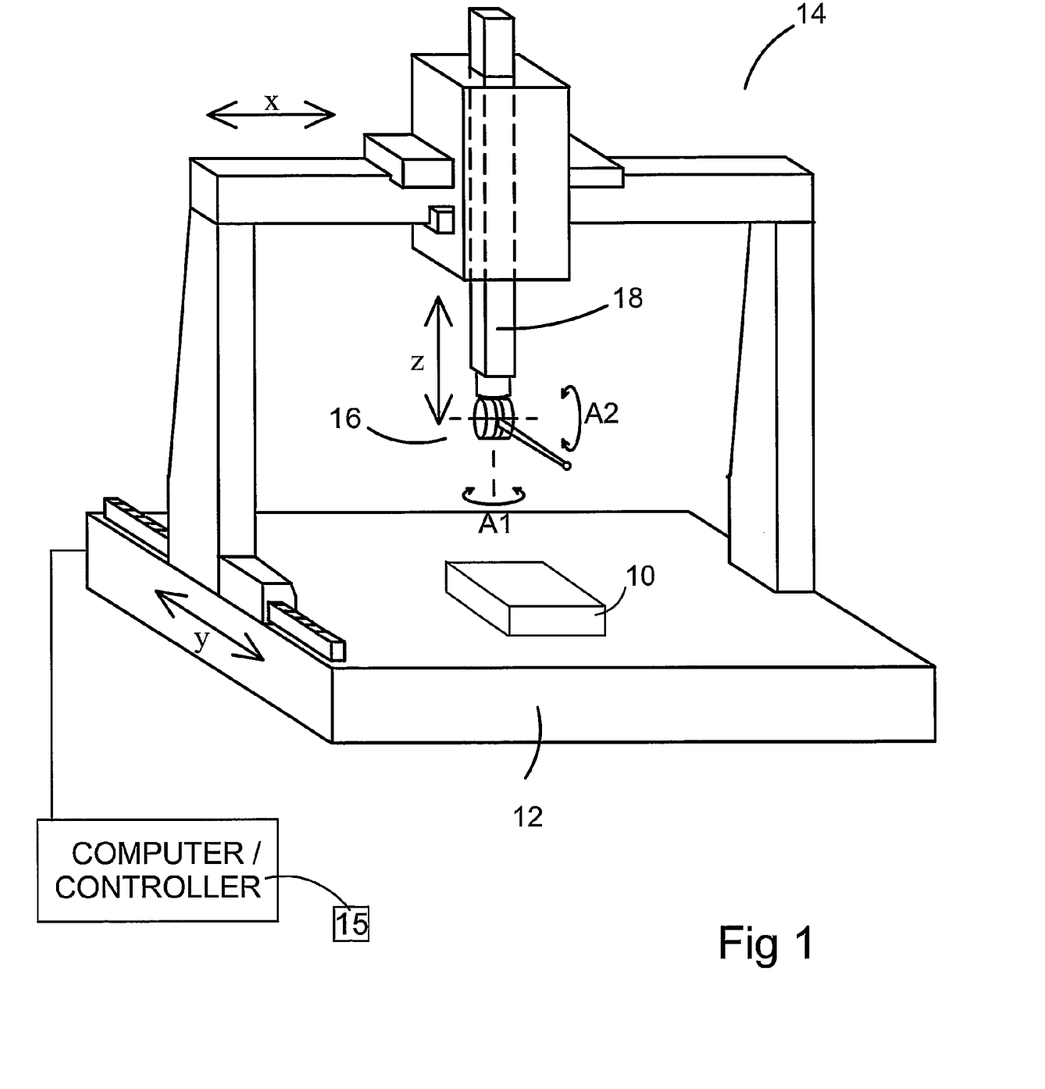
FIG. 1 is an elevation of a coordinate measuring machine including scanning apparatus according to the present invention.
Figure 2:
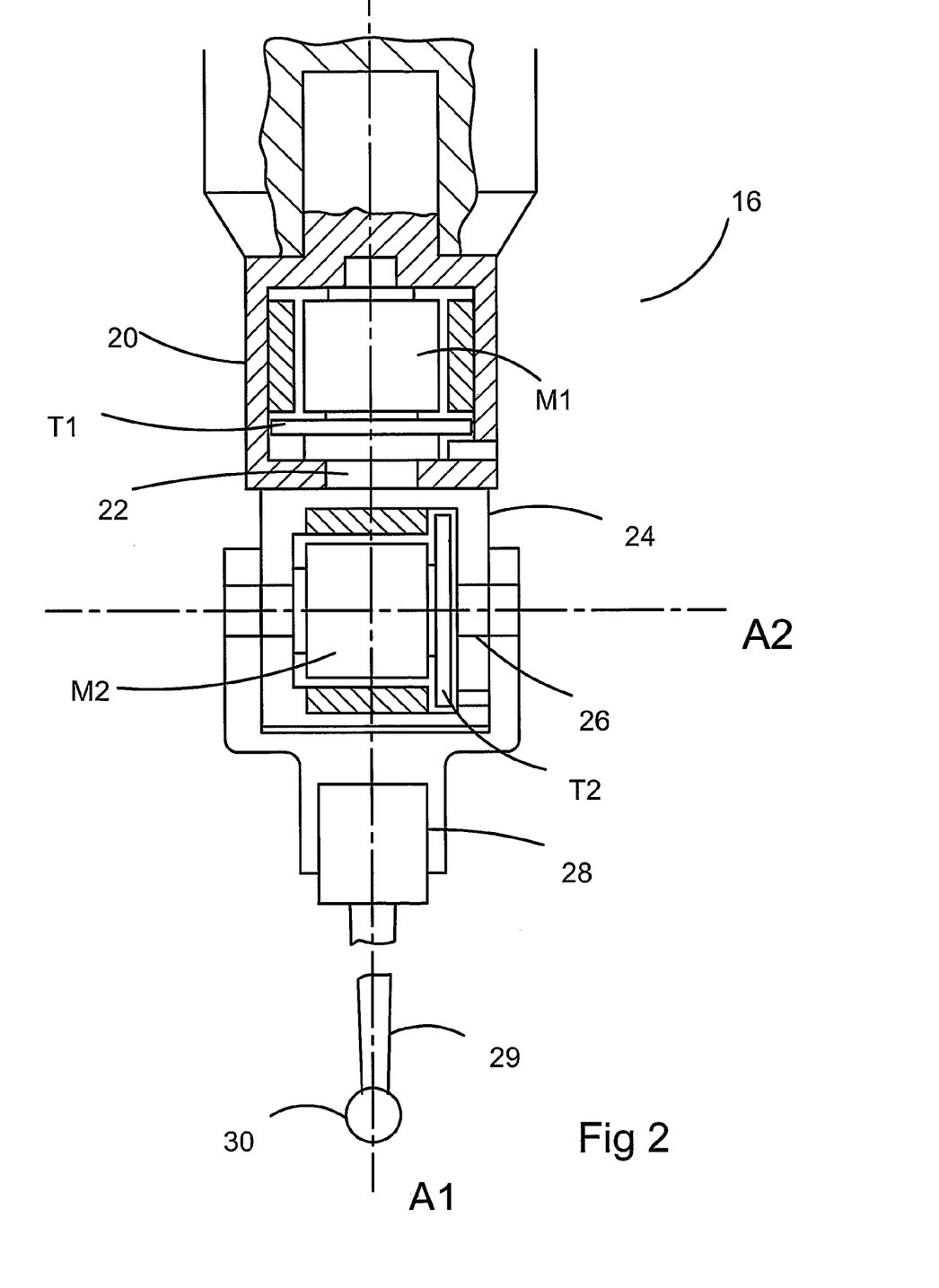
FIG. 2 is a cross-section of a motorized scanning head.

FIG. 1 illustrates a motorized scanning head mounted on a coordinate measuring machine (CMM). A workpiece 10 to be measured is mounted on a table 12 of the CMM 14 and a motorized scanning head 16 is mounted on a quill 18 of the CMM 14. The spindle is drivable in the directions X,Y,Z relative to the table by motors in a known manner. As illustrated in FIG. 2, the motorized scanning head 16 comprises a fixed part formed by a base or housing 20 supported by a movable part in the form of a shaft 22 rotatable by motor M1 relative to housing 20 about an axis A1. The shaft 22 is secured to a further housing 24 which in turn supports a shaft 26 rotatable by a motor M2 relative to the housing 24 about an axis A2 perpendicular to the axis A1.

A probe 28 with a stylus 29 having a workpiece contacting tip 30 is mounted onto the motorized scanning head. The arrangement is such that the motors M1,M2 of the head can position the workpiece contacting tip angularly about the axes A1 or A2 and the motors of the CMM can position the motorized scanning head linearly anywhere within three dimensional coordinate framework of the CMM to bring the stylus tip into a predetermined relationship with the surface being scanned.

Linear position transducers are provided on the CMM for measuring linear displacement of the scanning head and angular position transducers T1 and T2 are provided in the scanning head for measuring angular displacement of the stylus about the respective axes A1 and A2.

In the type of CMM illustrated in FIG. 1, relative movement between the quill and the workpiece is obtained by enabling the quill to move in three orthogonal directions. In other types of coordinate positioning apparatus, relative movement between the quill and the workpiece may be obtained by movement of the quill, movement of the surface on which the workpiece is mounted (e.g. the table) or a combination of the above.

The probe has a deflectable stylus 29 and transducers in the probe measure the amount of stylus deflection. The probe may be two-dimensional e.g. sensing deflection in X and Y or three-dimensional e.g. sensing deflection in X, Y and Z. Alternatively a non-contact probe may be used (e.g. an optical, capacitance or inductance probe).

On a vertical arm CMM as shown in FIG. 1, the A1 axis of the scanning head 16 is nominally parallel to the CMM Z axis (which is along the spindle 18). The scanning head may rotate the probe continuously about this axis. The A2 axis of the scanning head is orthogonal to its A1 axis.

The motorized scanning head can position the surface sensing device in different orientations without recalibration of the head being required.

The positions of the CMM and scanning head are controlled by a control code which is provided on a computer 15 which may be a bespoke piece of hardware i.e. a controller or a P.C. The computer may be programmed to move the CMM and scanning head along measurement paths.

Figure 3:
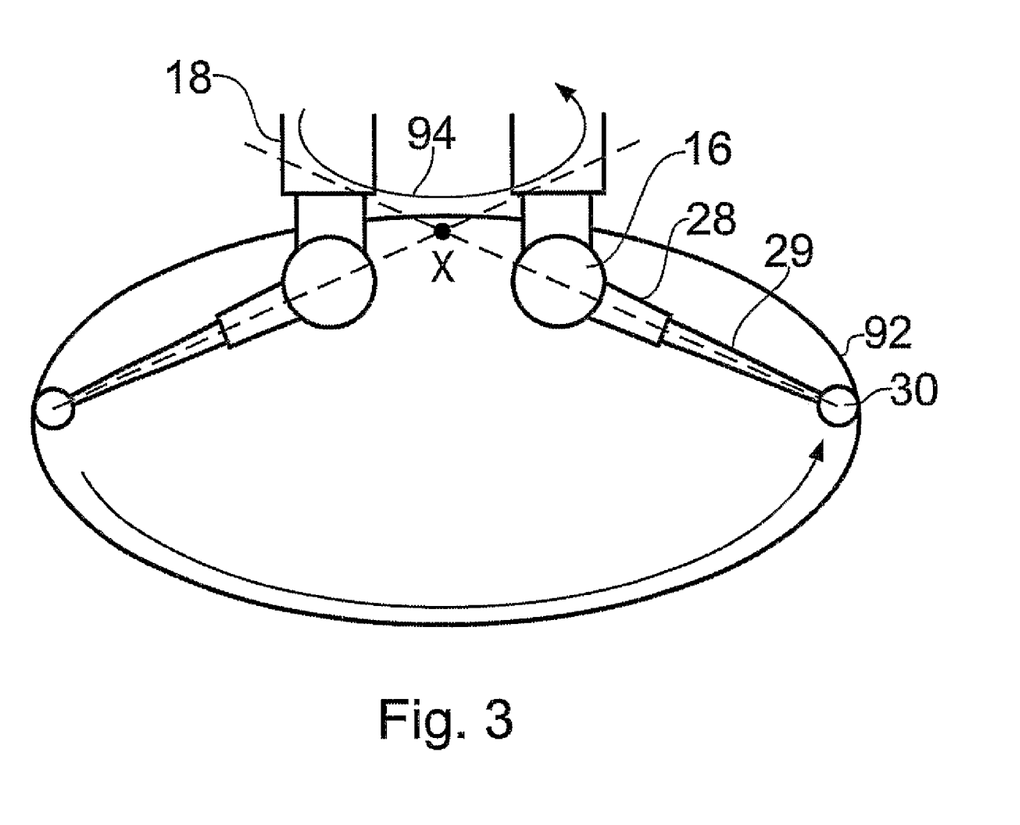
FIG. 3 illustrates a perspective view of a scanning head scanning a large bore.

One feature which is particularly suitable for measurement with the apparatus described above is a bore. Conventionally, bores are measured by moving the CMM quill along the centre line of the bore and rotating the scanning head in a circle, thereby producing a helical trajectory for the stylus tip (as disclosed in WO90/07097). However, this method cannot be used for large bores, if the radius of the bore is such that the stylus tip cannot reach the bore surface when the CMM quill is located on the centre line. In some cases the angle of the probe required to reach the surface when the CMM quill is on the centre line is not practical. In this case, the CMM quill 18 is moved in a circle 94 as the scanning head 16 rotates, as illustrated in FIG. 3. This has the advantage that although CMM movement is required, it is minimized due to the motion of the scanning head.

In this example, the stylus tip 30 is rotating about a virtual pivot X. This virtual pivot point is not located at the intersection of the head axes, as with the conventional bore scanning method, in which the head is kept on the centre line.

In this example, the lead angle of the probe is kept radial to the surface.

Figure 13:
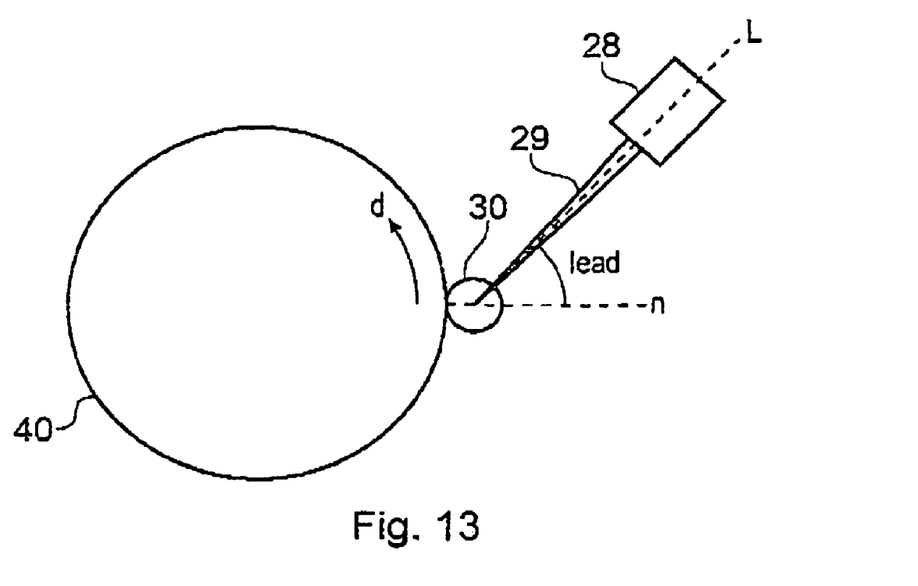
FIG. 13 is a plan view of a cylindrical boss showing a lead angle.
Figure 14:
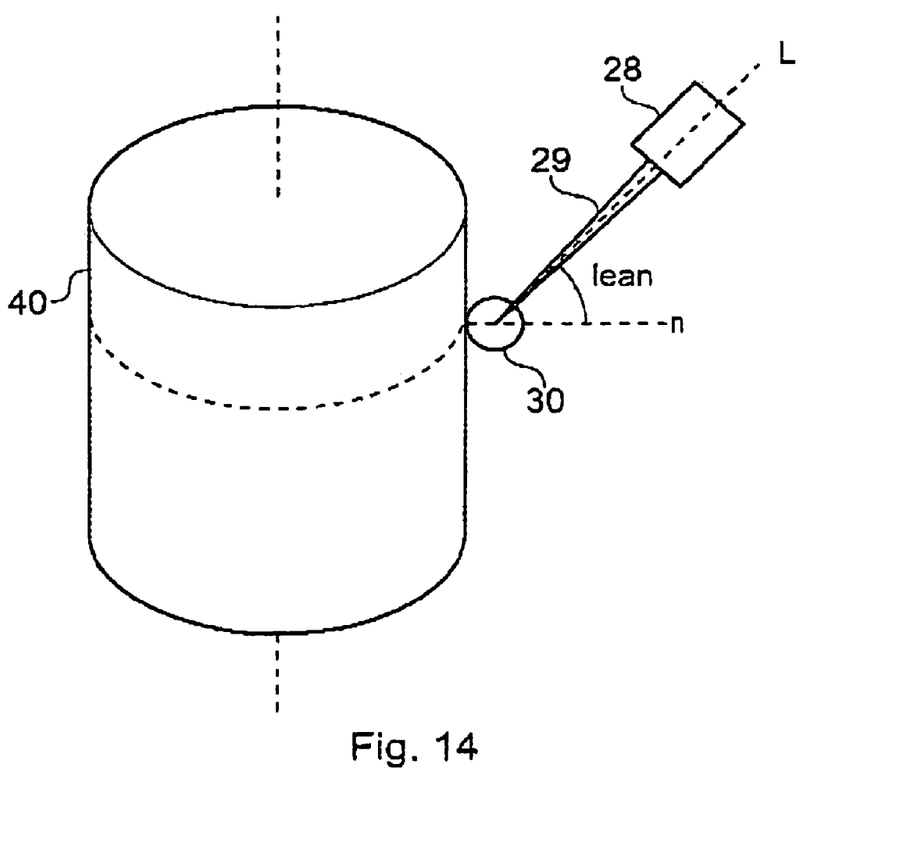
FIG. 14 is a perspective view of a cylindrical boss showing a lean angle.

The terms lead and lean angles are explained with respect to FIGS. 13 and 14 which show a cylindrical boss 40 being measured by a probe 28. FIG. 13 is a plan view of the cylindrical boss. The angle between longitudinal axis L of the probe and the surface normal n in the direction of travel d is the lead angle. FIG. 14 is a perspective view of the cylindrical boss 40 of FIG. 13. The angle between the longitudinal axis L of the probe and the surface normal n in the plane of the scan is the lean angle.

It is advantageous to keep the lead angle nominally constant throughout the measurement for ease of programming, simplicity of the CMM path (as this results in constant angular velocity), constant rate of change of acceleration (providing a smoother scan) and a good relationship of the tip to the surface. The probe may be pushed (i.e. ahead of the scanning head), dragged (i.e. behind the scanning head) or kept aligned with the surface normal in at least one plane.

The lean angle can be varied throughout the scan. This may be advantageous for access etc.

The conventional method of bore scanning is also not suitable for very small bores.

Figure 4:
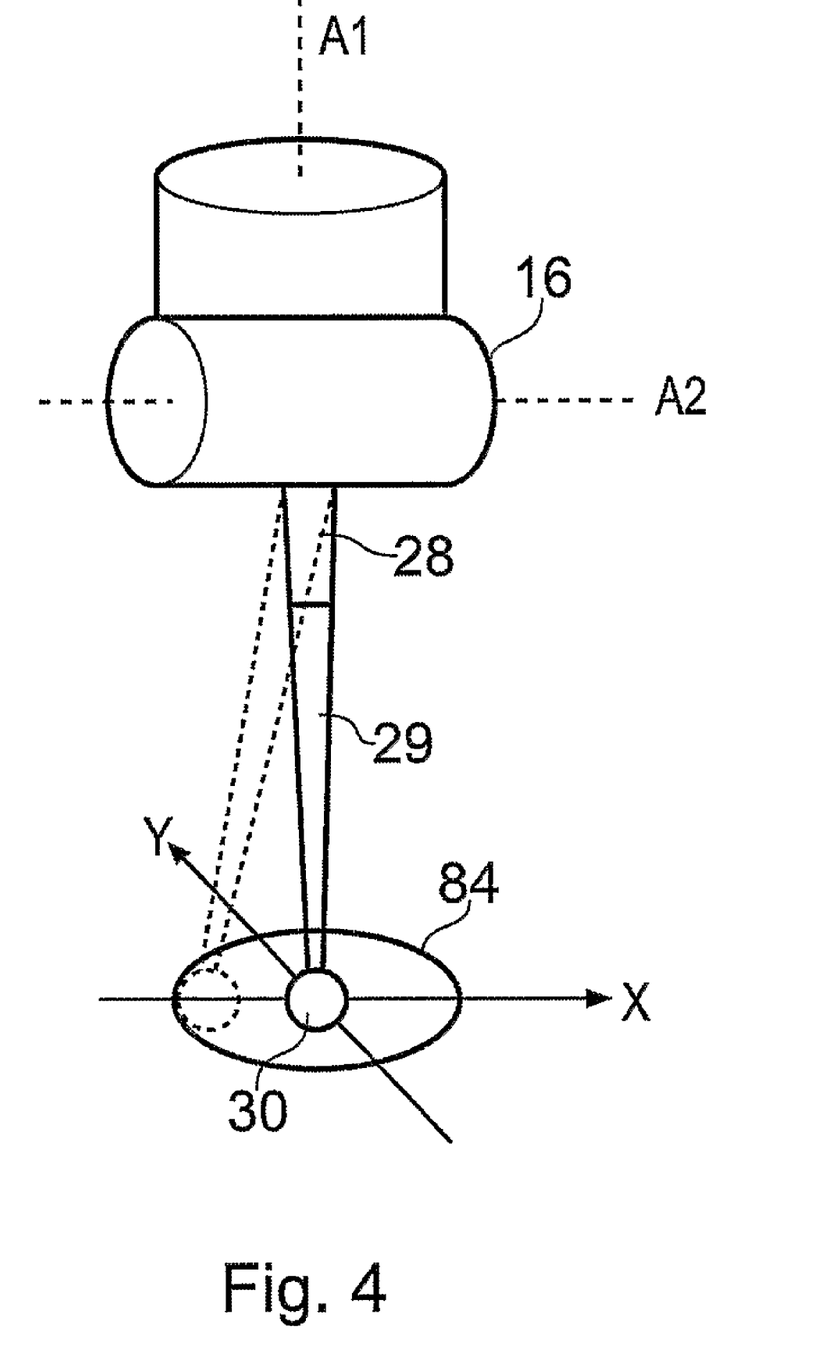
FIG. 4 is a perspective view of a stylus tip in a small bore.
Figure 5:
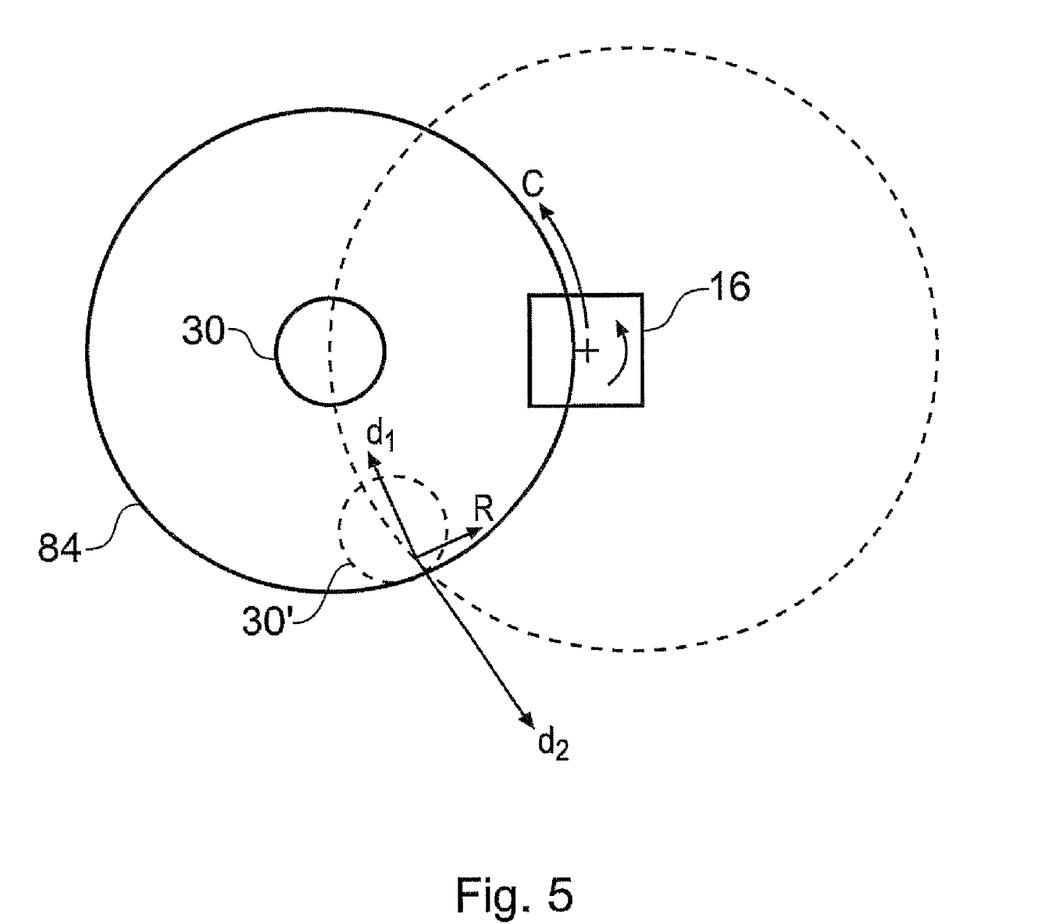
FIG. 5 is a plan view of the small bore of FIG. 4.

FIG. 4 illustrates a small vertical bore 84 being measured by a probe 28 mounted on a scanning head 16. Misalignment of the stylus tip 30 with the scanning head can cause the stylus tip to be off centre, as shown by the dashed stylus and tip. If the stylus tip 30 is located off centre along A2, the scanning head is not able to manipulate the stylus tip in both X and Y directions in order to scan the bore. FIG. 5 is a plan view of the stylus tip, quill and small bore. The scanning head has been offset along the X axis to position the stylus tip in the centre of the bore. By rotating the stylus tip about the A2 axis (along the circular path shown by dashed line), the stylus tip 30 can be brought into contact with the surface of the bore (as shown by the dashed outline 30'). However, the drive vector $d_2$ is in non ideal direction in relation to the direction in which deflection must be controlled ($d_1$ vector along the surface normal) making the scan impossible. It can be seen that moving the stylus tip 30 along the dashed path around the quill, as in conventional methods would not be effective.

By using the quill to move the scanning head in a circular path, shown by the arrow C, a new resultant drive vector R is achieved which is tangential to the surface of the bore and perpendicular to the deflection control vector. If the scanning head is rotated about the A1 axis as it follows the circular path, the A2 axis can be kept aligned with the surface normal, allowing adjustment of the deflection.

As in the large bore example, the stylus tip is moving about a virtual pivot which is not at the intersection of the axes.

This method has the advantage that it allows areas to be measured where access is restricted.

Figure 6:
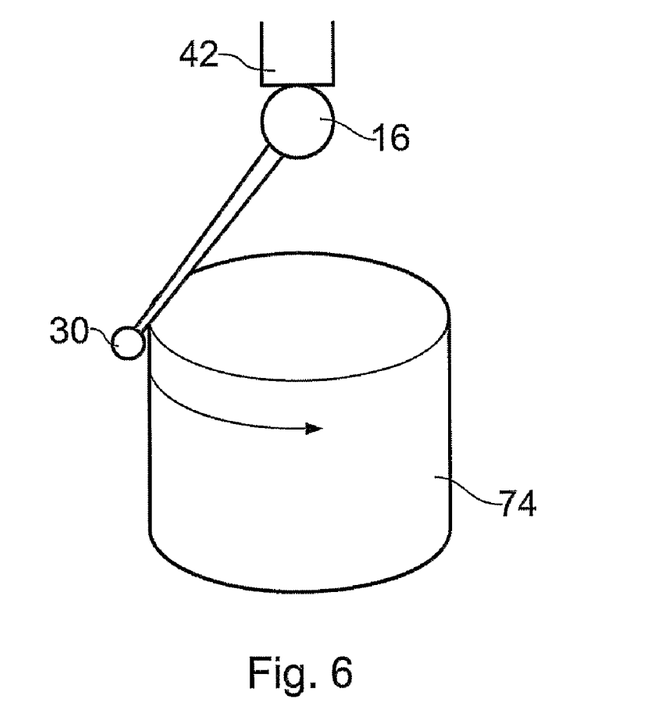
FIG. 6 is a perspective view of a boss being measured with a scanning head aligned with the axis of the boss.

FIG. 6 illustrates a boss 74 the external surface of which is to be measured. The quill 42 of the CMM is aligned with the centre line of the boss. The motorized scanning head 16 is then rotated about the A1 axis so the stylus tip 30 performs a measurement of the circumference towards the top of the boss. However this method has the disadvantage that it cannot be repeated further down the boss, as the tip 30 will no longer be able to contact the surface.

Figure 7:
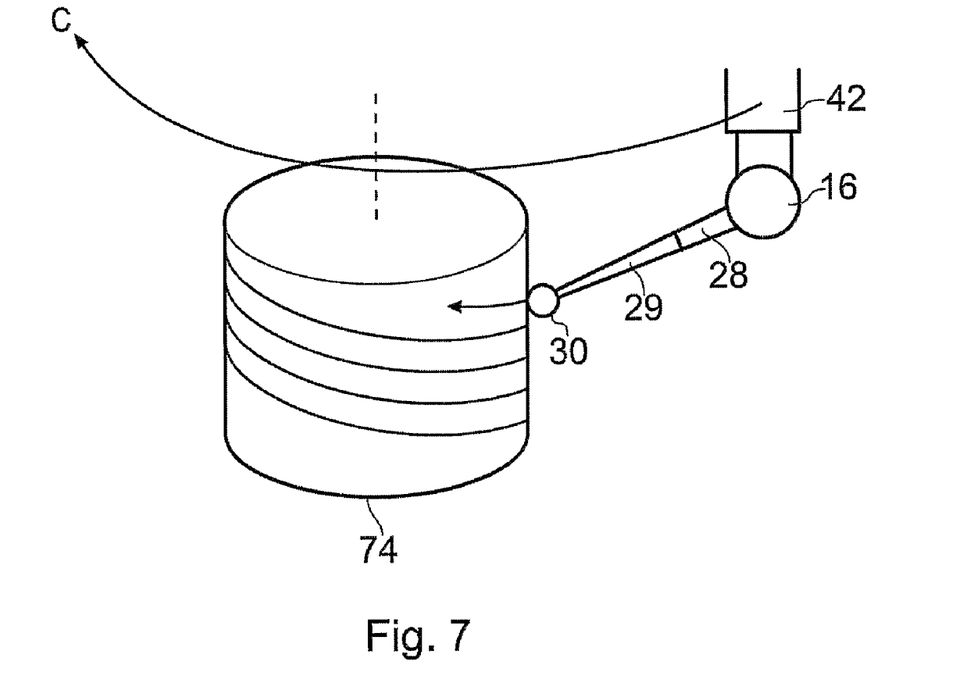
FIG. 7 illustrates the boss of FIG. 5 with a spiral scan path.

FIG. 7 shows an alternative method for scanning a boss 74. In this embodiment, the CMM quill is moved in a circular path C about the axis of the boss, as the head angles rotate. The CMM may also be moved in Z to create a spiral scan path about the circumferential surface of the boss.

Figure 8:
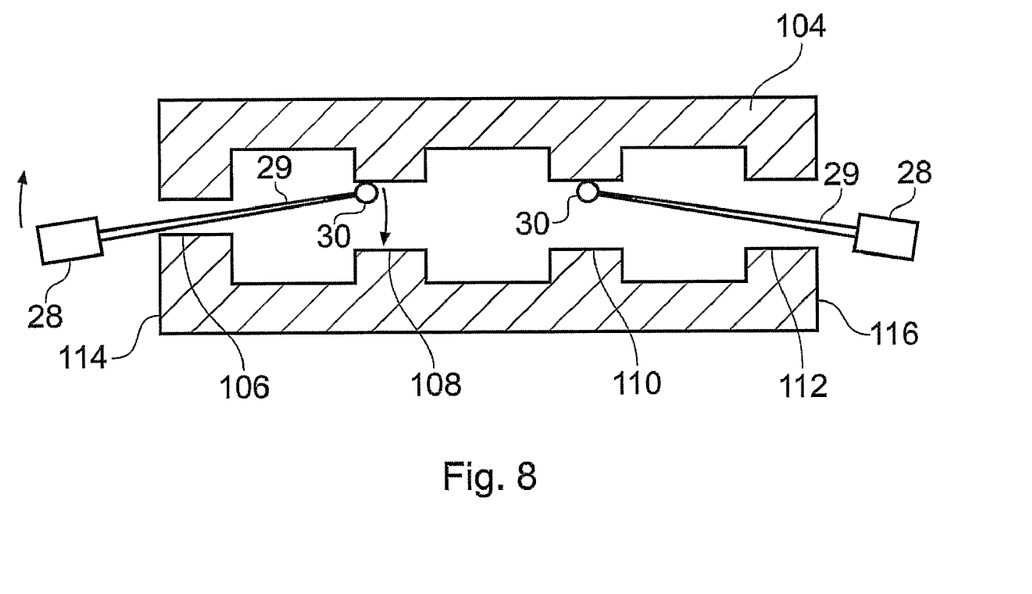
FIG. 8 is a cross section of a crank shaft journal being measured by a probe mounted on a motorized scanning head.

FIG. 8 illustrates a cross section of a crank shaft journal 104, with four cylindrical sections 106, 108, 110, 114 to be measured. Measurement of portion 108 is difficult by conventional means due to the reduced access caused by the small diameter of portion 106. In conventional measurement techniques a disc stylus would typically be used to measure portion 108 which has the disadvantage that stylus changing steps are required, thereby reducing throughput.

Using the present invention, all the portions 106-112 can be measured without any stylus changing being required. Portions 106 and 108 are measured from end 114 of the crank shaft journal, as long as the probe length is sufficiently long to reach portion 108, and portions 110 and 112 are measured from end 116.

The motion of the CMM quill and the head angles are controlled to allow the portion 108 to be accessed through the restricted diameter of portion 106. The CMM quill is moved in a circular locus whilst the head angles are adjusted so that the stylus tip also moves in a circular path around the inner circumference of the cylindrical portion 108. This motion effectively creates a virtual pivot about which the stylus tip rotates. The motion of the quill and head can be controlled so that the virtual pivot is located in the cylindrical portion 106, thereby enabling access to portion 108 without collision.

Figure 9A:
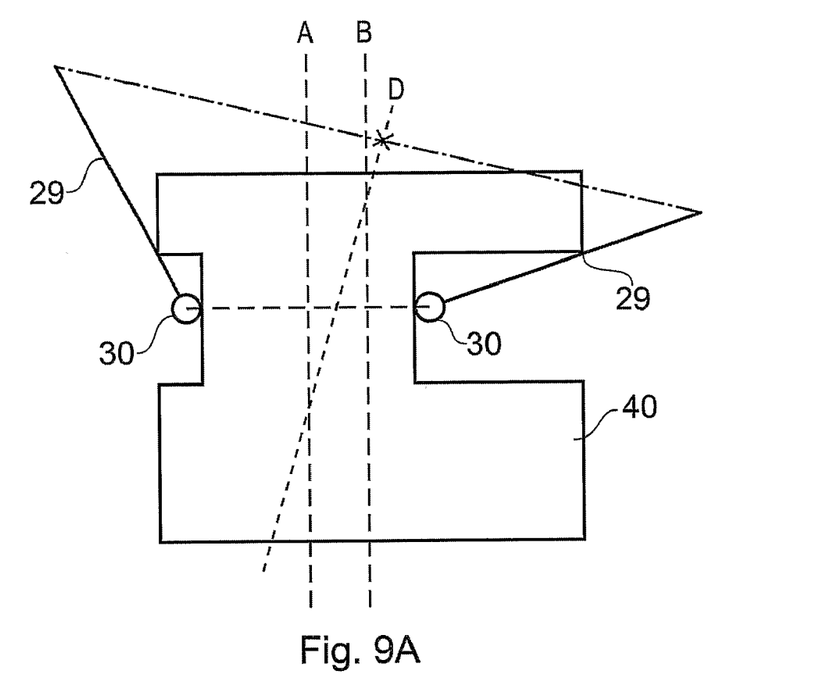
FIG. 9A is a cross section through a part of a cam shaft showing a first scan profile.

For more complex parts, the circular path of the CMM must be about a different axis than the circular path of the stylus tip. FIG. 9A is a cross section through part of a cam shaft 40. The inner section has a central line A whilst the outer section has a central line B. To scan around the inner diameter, the stylus tip 30 must follow a path about centre line A, however the shape of the cam shaft creates access problems and constraints to the movement of the quill. If the stylus tip is to stay in a single plane, the quill is rotated about an axis D which is off axis from either of centre lines A or B. As can be seen from FIG. 9A, the axis D about which the quill moved is at an angle to both centre lines A and B.

Figure 9B:
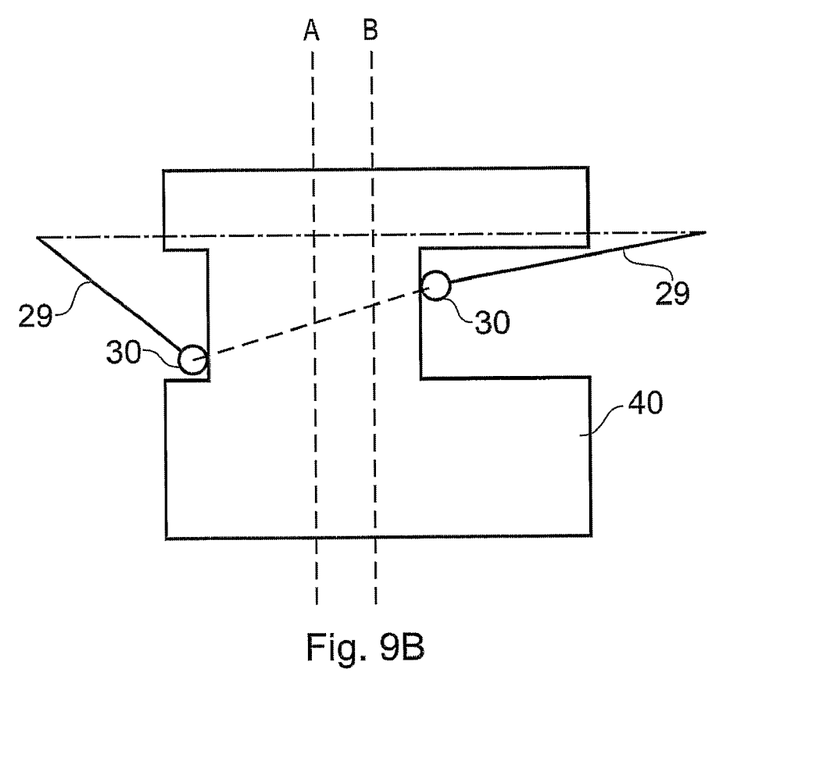
FIG. 9B is a cross section through a part of a cam shaft showing a second scan profile.

Alternatively, the quill of the CMM is moved in a circular path about centre line B of the part of the cam shaft 40, as illustrated in FIG. 9B. In this example, the probe is rotated through 360° about the A1 axis as the quill moves around its circular path so that the stylus tip remains radial to the inner diameter as the scan progresses. The stylus tip is kept on the inner diameter by adjusting the angle about the A2 axis of the head. Thus the stylus tip measures the inner diameter but will not keep in a single plane. In this example, the axis about which the quill rotates B is parallel but offset to the axis A of the feature being measured.

If the CMM quill is moved upwards such that a spiral motion is obtained, a cylindrical measurement is obtained of the cam shaft part.

For a similar part rotated by 90°, the head angles will be adjusted about both the A1 and A2 axes.

Figure 10:
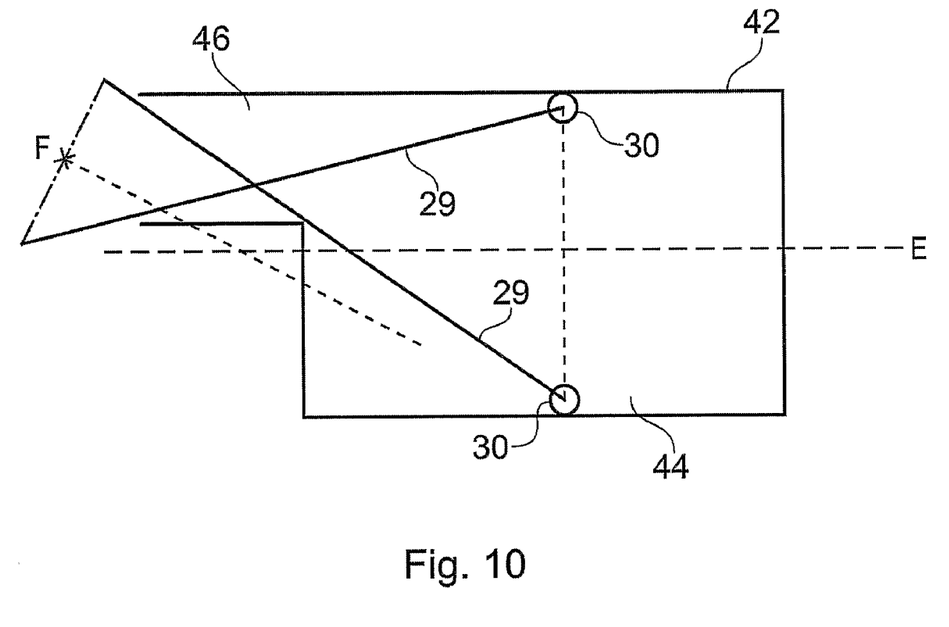
FIG. 10 is a cross section through a cylindrical recess.

FIG. 10 illustrates a feature 42, such as that found in a fabricated gear box, which has a cylindrical recess 44 with an obscured access 46, the opening not being aligned with the central axis E of the cylindrical recess. The inside surface of the cylindrical recess 44 cannot be scanned by the method illustrated in FIG. 8 due to access problems. An off axis pivot F is chosen for the circular motion of the quill, thereby resolving the restricted access.

In the present invention the five axes of the system (i.e. three linear CMM axes and two rotary head axes) are synchronized. This enables the virtual pivot measuring method to be effective over the whole measurement path.

Figure 11A:
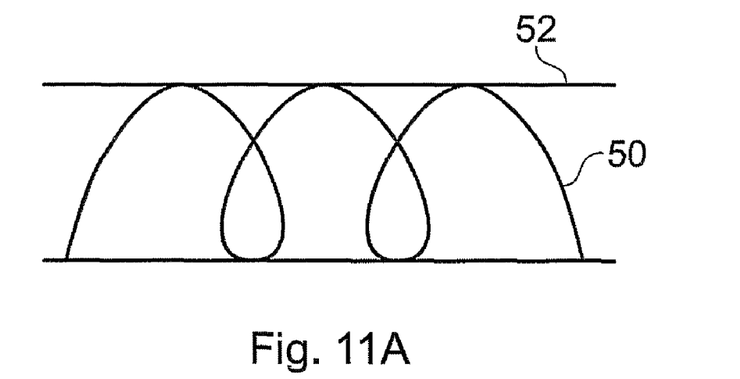
FIGS. 11A-11C illustrate the spiral scan profiles of a correct sized bore, undersized bore and oversized bore respectively, according to a conventional technique.
Figure 11B:
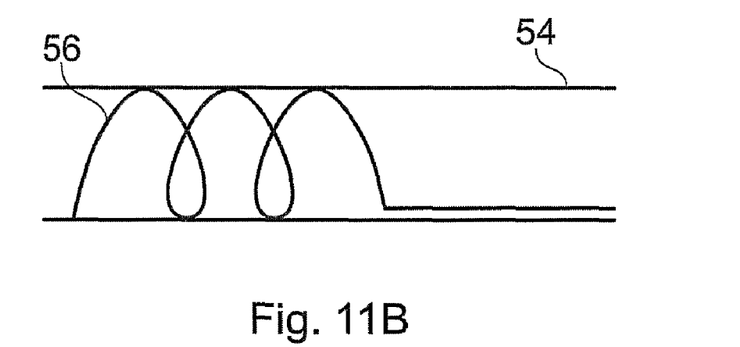
Figure 11C:
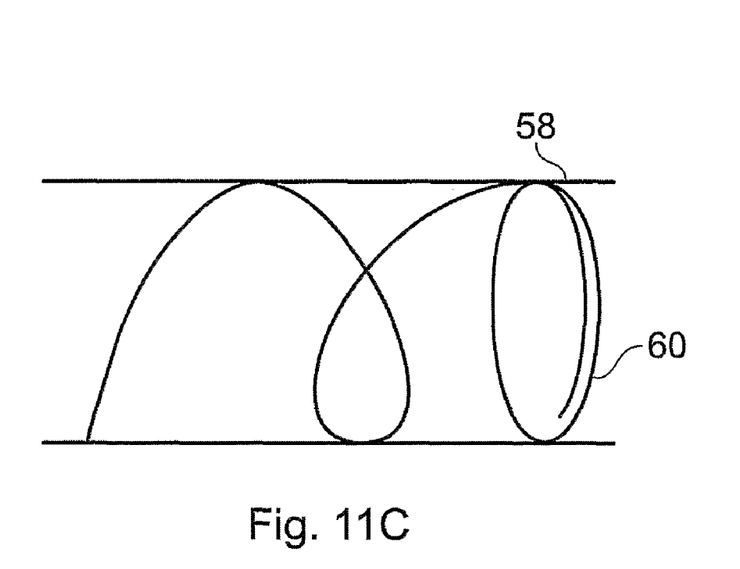

A non synchronous system for measuring a bore using a 2 axis scanning head mounted on a 3 axis CMM is described with reference to FIGS. 11A to 11C To achieve a spiral motion, the CMM is given demand signals which control its velocity in each axis. The scanning head is given demand signals which define the probe tip speed and the number of revolutions required. FIG. 11A shows the resulting spiral motion 50 of the probe tip when measuring a bore 52. However, if the bore is narrower than anticipated, the three revolutions of the scanning head will occur before the end of scan and part of the bore will only be measured by linear motion of the CMM. FIG. 11B illustrates the narrower bore 54 and resulting spiral motion 56. If the bore is wider than anticipated, the CMM will have moved the quill to the end of the scan before the three revolutions of the quill are completed. FIG. 11C illustrates the wider bore 58 and the resulting spiral motion 60.

Figure 12:
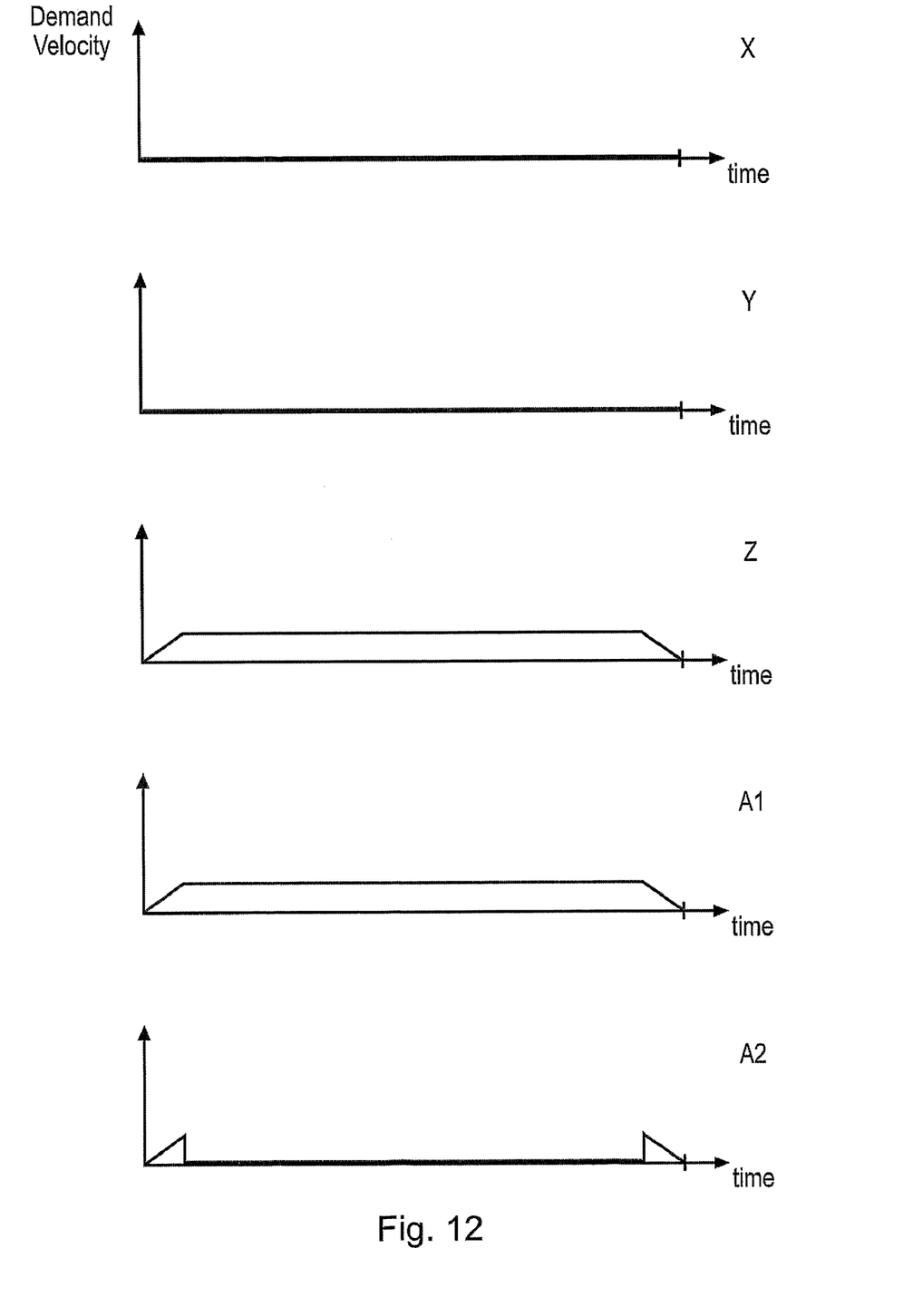
FIG. 12 is a graph showing demand velocity against time for each axis of motion of the metrology system.

In the present invention, the five axes are synchronized. FIG. 12 illustrates a graph showing demand velocity against time for a scan of a vertical bore (by conventional means) for all five axes (X,Y,Z,A1,A2). The controller outputs demand signals in time increments, ensuring that the motion of the CMM and scanning head remains synchronized. Thus if a feature has a different shape, size or position than expected, the synchronized motion will ensure the CMM and scanning head motion will occur over the length of the measurement profile. In the illustration in FIG. 12, the demand velocity for X and Y is zero, whereas the demand velocity is constant for Z to move the quill along the centre line of the Z axis. The demand voltage for A1 is constant as the scanning head rotates the probe about the A1 axis. Both the Z and A1 show the velocity being ramped up and down at the beginning and end of the scan. The A2 axis shown the probe being rotated about the A2 axis at the beginning of the scan to deflect it from the centre of the bore to the surface and the reverse at the end of the scan.

All the embodiments disclose a part being measured with circular or spiral motion of the CMM and motion of the scanning head about one or both axes. This method is also suitable for arcuate motion of the CMM. The motion about both axes of the scanning head is driven to the demanded angles. This has the advantage of constant speed and a defined measurement path on the measurement artifact. In conventional techniques, the scanning head used a constant torque mode to bias the stylus tip against a surface. It is this constant torque which causes rotation of the scanning head rather than demand signals.

During the measurement of the part, the probe must be kept within its deflection range (and non contact probes must be kept within their working range). This is achieved by deviating the scanning head from its prescribed motion. The scanning head is served along a target vector to maintain the probe within its range. Typically this target vector is normal to the surface. However, factors such as the orientation of the probe, friction or the requirement to stay on a required profile may cause a different target vector to be chosen. Known part data, calculated tip position, historic surface points used to project forwards etc may be used to determine the target vector.

The embodiments above describe line scans for clarity. However, it will be understood that this invention is also suitable for sweep scans and measuring discrete points.

The embodiments described above are all suitable for planning a measurement path on a part. This may either be done online, for example by using a joystick to control the scanning head and CMM to thereby take discrete points on the surface having the desired stylus tip position and head angles. The data for these discrete points may be stored in memory and/or used to derive the measurement path of the stylus tip, scanning head and CMM quill.

Alternatively, the measurement path may be planned offline, for example on a CAD model. In this case the measurement profile comprising the stylus tip path, head angles and quill path is selected on the CAD model. This data is stored in memory and/or used to derive the measurement path of the stylus tip, scanning head and CMM quill.

Whether the measurement path has been created on line (i.e. with a joystick) or off line (e.g. on a CAD model), the measurement path data is converted into command code which sends position demand codes to the CMM and scanning head to follow the desired measurement paths when measuring a part.

Although the embodiments above describe the use of a contact probe, these scanning methods are also suitable for use with a non-contact probe, for example an optical, inductance or capacitance probe. For an optical probe, the light spot on the surface may be treated as equivalent to the stylus tip position, for example. For inductance or capacitance probes, an offset may be treated as equivalent to the stylus tip position. For both contact and non contact probes, the stylus tip is effectively a pivot point about which the probe may be orientated and still measure the same coordinate position.

Although the embodiments describe a scanning head mounted on a CMM, this invention is also suitable for a scanning head mounted on other types of coordinate positioning machine, such as a machine tool. Although the term quill is used in this description, the member is also commonly referred to as a Z column or spindle. Although the term scanning head is used, the scanning head is suitable for taking discrete measurement points as well as scanning.

The invention claimed is:

1. A method for measuring a surface profile using a surface sensing device mounted on a scanning head on a member of a coordinate positioning apparatus, wherein the coordinate positioning apparatus may be operated to produce relative movement between the scanning head and the surface profile and wherein the scanning head includes a drive for producing rotational movement of the surface sensing probe about one or more axes, the method comprising:
   driving the coordinate positioning apparatus to provide relative movement between the member and the surface profile in a circular or spiral path which is superimposed onto a linear motion; and
   driving the scanning head to move the surface sensing device with a rotational motion about said one or more axes,
   wherein circular or spiral motion of the member of the coordinate positioning apparatus and the rotational motion of the scanning head are synchronous with each other.

2. A method according to claim 1 wherein the circular or spiral motion of the member is about an axis of the surface profile.

3. A method according to claim 1 wherein the circular or spiral motion of the member is about an axis which is at an angle to a central axis of the surface profile.

4. A method according to claim 1 wherein the circular or spiral motion of the member is about an axis which is parallel but offset to a central axis of the surface profile.

5. A method according to claim 1 wherein the motion of the coordinate positioning apparatus and the scanning head is synchronized through time increments.

6. A method according to claim 1 wherein the surface sensing device performs an oscillating motion.

7. A method according to claim 1 wherein rotational movement about at least one axis of the scanning head is used to keep the surface sensing device within its measurement range.

8. A method according to claim 1, wherein the scanning head is driven to move the surface sensing device such that a lead angle is nominally constant.

9. A non-transitory computer readable medium on which is recorded a program for causing a computer to perform a method for measuring a surface profile using a surface sensing device mounted on a scanning head on a member of a coordinate positioning apparatus, wherein the coordinate positioning apparatus may be operated to produce relative movement between the scanning head and the surface profile and wherein the scanning head includes a drive for producing rotational movement of the surface sensing probe about one or more axes, the method comprising:
   driving the coordinate positioning apparatus to provide relative movement between the member and the surface profile in a circular or spiral path which is superimposed onto a linear motion; and
   driving the scanning head to move the surface sensing device with a rotational motion about said one or more axes,
   wherein circular or spiral motion of the member of the coordinate positioning apparatus and the rotational motion of the scanning head are synchronous with each other.

10. Apparatus for measuring a surface profile comprising a surface sensing device mounted on a scanning head on a member of a coordinate positioning apparatus, wherein the coordinate positioning apparatus may be operated to produce relative movement between the scanning head and the surface profile and wherein the scanning head includes a drive for producing rotational movement of the surface sensing probe about one or more axes, and a computing device, the computing device carrying out the following steps:
   driving the coordinate positioning apparatus to provide relative movement between the member and the surface profile in a circular or spiral path which is superimposed onto a linear motion;
   driving the scanning head to move the surface sensing device with a rotational motion about said one or more axes,
   wherein circular or spiral motion of the member of the coordinate positioning apparatus and the rotational motion of the scanning head are synchronous with each other.

11. Apparatus according to claim 10, wherein the scanning head is driven to move the surface sensing device such that a lead angle is nominally constant.

12. Apparatus according to claim 10, wherein the circular or spiral motion of the member is about an axis of the surface profile.

13. Apparatus according to claim 10, wherein the circular or spiral motion of the member is about an axis which is at an angle to a central axis of the surface profile.

14. Apparatus according to claim 10, wherein the circular or spiral motion of the member is about an axis which is parallel to, but offset from, a central axis of the surface profile.

15. Apparatus according to claim 10, wherein the motion of the coordinate positioning apparatus and the scanning head is synchronized through time increments.

16. Apparatus according to claim 10, wherein rotational movement about at least one axis of the scanning head is used to keep the surface sensing device within its measurement range.

* * * * *